United States Patent [19]
Fu-Chung

[11] Patent Number: 5,788,013
[45] Date of Patent: Aug. 4, 1998

[54] AUTOMATIC HORIZONTAL REPLENISHING DEVICE FOR LIQUID OIL AND THE LIKE

[76] Inventor: Chen Fu-Chung, 56, Min Sheng St., Fengyuan, Taichung, Taiwan

[21] Appl. No.: 786,456

[22] Filed: Jan. 21, 1997

[51] Int. Cl.[6] ............................................. F16N 11/08
[52] U.S. Cl. .......................... 184/74; 184/82; 184/84; 184/103.1
[58] Field of Search ........................ 184/65, 74, 82, 184/84, 103.1

[56] References Cited

U.S. PATENT DOCUMENTS

| | | | |
|---|---|---|---|
| 2,141,863 | 12/1938 | Hammond | 184/103.1 |
| 2,282,275 | 5/1942 | Westburgh | 184/103.1 |
| 2,979,161 | 4/1961 | Lyden | 184/84 |
| 4,034,831 | 7/1977 | Gruett | 184/103.1 |
| 4,342,376 | 8/1982 | Lyden | 184/103.1 |

Primary Examiner—Thomas E. Denion
Attorney, Agent, or Firm—Pro-Techtor International

[57] ABSTRACT

An automatic device for replenishing the liquid oil and the like is composed of an oil container, a cap, an oil injecting seat, an oil blocking body, and a connection seat. The oil container is provided at the bottom thereof with a joint fastened therewith rotatably. The oil injecting is located in the joint and is provided at the bottom thereof with a cut. The connection seat is fastened at the top end thereof with the joint. When the oil consumption has reached an extent that the cut of the oil injecting seat and the oil level surface form therebetween a gap, the atmospheric air is drawn into the connection seat through which the atmospheric air flows into the joint via the gap, thereby resulting in an automatic replenishing of the oil. As soon as the gap is eliminated, the atmospheric air is kept out of the connection seat so as to bring about an end to the replenishing process of oil.

2 Claims, 4 Drawing Sheets

5,788,013

AUTOMATIC HORIZONTAL REPLENISHING DEVICE FOR LIQUID OIL AND THE LIKE

FIELD OF THE INVENTION

The present invention relates generally to an automatic device for replenishing a liquid material, and more particularly to an automatic device for replenishing the liquid oil and the like.

BACKGROUND OF THE INVENTION

A machine is generally provided with a constant supply of lubricating or hydraulic oil for enabling the machine to operate normally and for prolonging the service life span of the machine. The lubricating effect of a fixed quantity of liquid oil is absolutely essential to the normal operation of the machines, such as a deceleration gear box, a pump, a generator, the crank box of a reciprocating air pressure machine, and so forth. The liquid oil is generally kept in an oil reservoir, which is attached to the machine and is provided with a see-through window to enable a machine operator to remain on the alert for the need to replenish manually the reservoir with the oil when the oil level in the reservoir drops under a certain level. The see-through window is generally provided with the warning lines of an upper limit and a lower limit to facilitate the easy observation by the machine operator.

Such a conventional replenishing device as described above is defective in design in that it is rather inefficient and primitive in nature, and that the replenishment of the liquid oil may be neglected by a careless or absent-minded machine operator, and further that the oil leak of the machine may be overlooked by the machine operator, and still further that the machine is highly vulnerable to breakdown or damage.

In addition, the manual replenishment of the liquid oil is rather unreliable at best and can not be easily controlled. For example, in the process of replenishing manually the deceleration gear box with the liquid oil, it is likely that an excess of the liquid oil may be added unintentionally by the machine operator and that the liquid oil is spilled all over the deceleration gear box or the floor.

SUMMARY OF THE INVENTION

It is therefore the primary objective of the present invention to provide an automatic device for replenishing the liquid oil essential to the normal operation of a machine. The automatic device of the present invention is capable of eliminating the shortcomings described above.

In keeping with the principle of the present invention, the foregoing objective of the present invention is attained by the automatic device for replenishing the liquid oil and the like. The automatic device comprises an oil container, a cap, an oil injecting seat, an oil blocking block, and a connection set. The device is capable of providing the machine operator with the information on the state of the consumption of the oil kept in the container of the device. The device is further capable of alerting the machine operator the likelihood that the oil leak is under way at the time when the oil level in the oil container of the device drops at a pace faster than normal thereby preventing the machine in operation form being damaged.

The foregoing objective, features, and advantages of the present invention will be more readily understood upon a thoughtful deliberation of the following detailed description of a preferred embodiment of the present invention in conjunction with the accompanying drawings.

DETAILED DESCRIPTION OF THE EMBODIMENT

Figure 1:
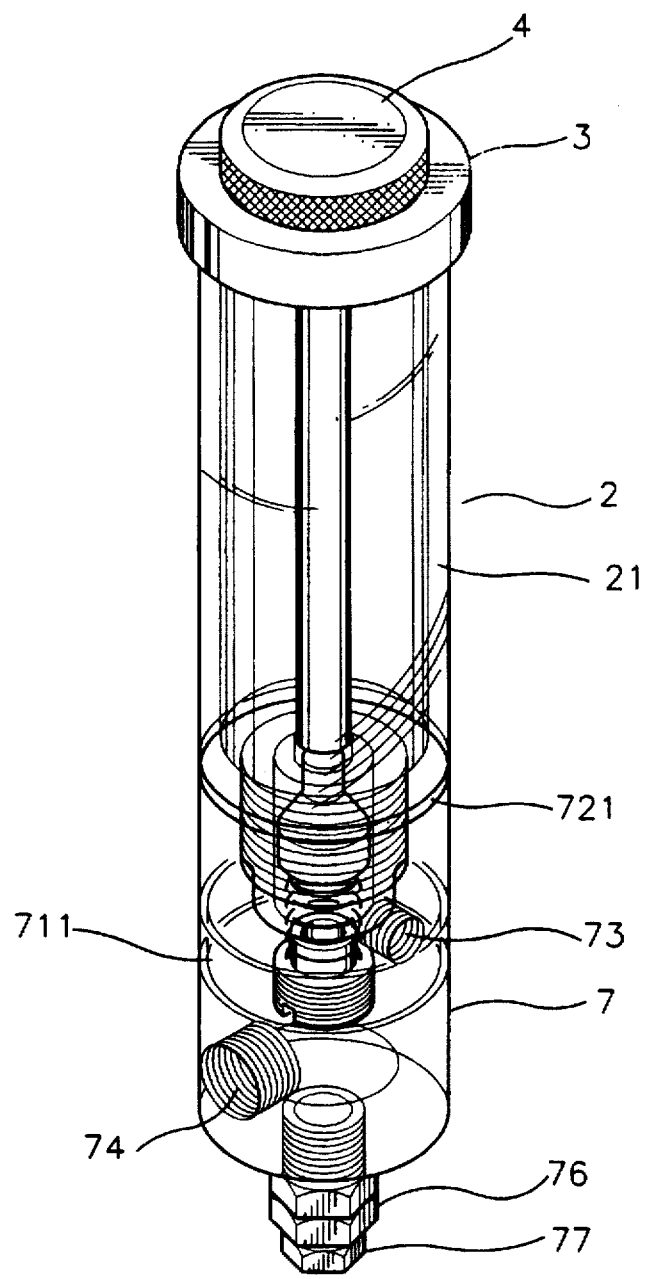
FIG. 1 shows a perspective view of the preferred embodiment of the preset invention.
Figure 2:
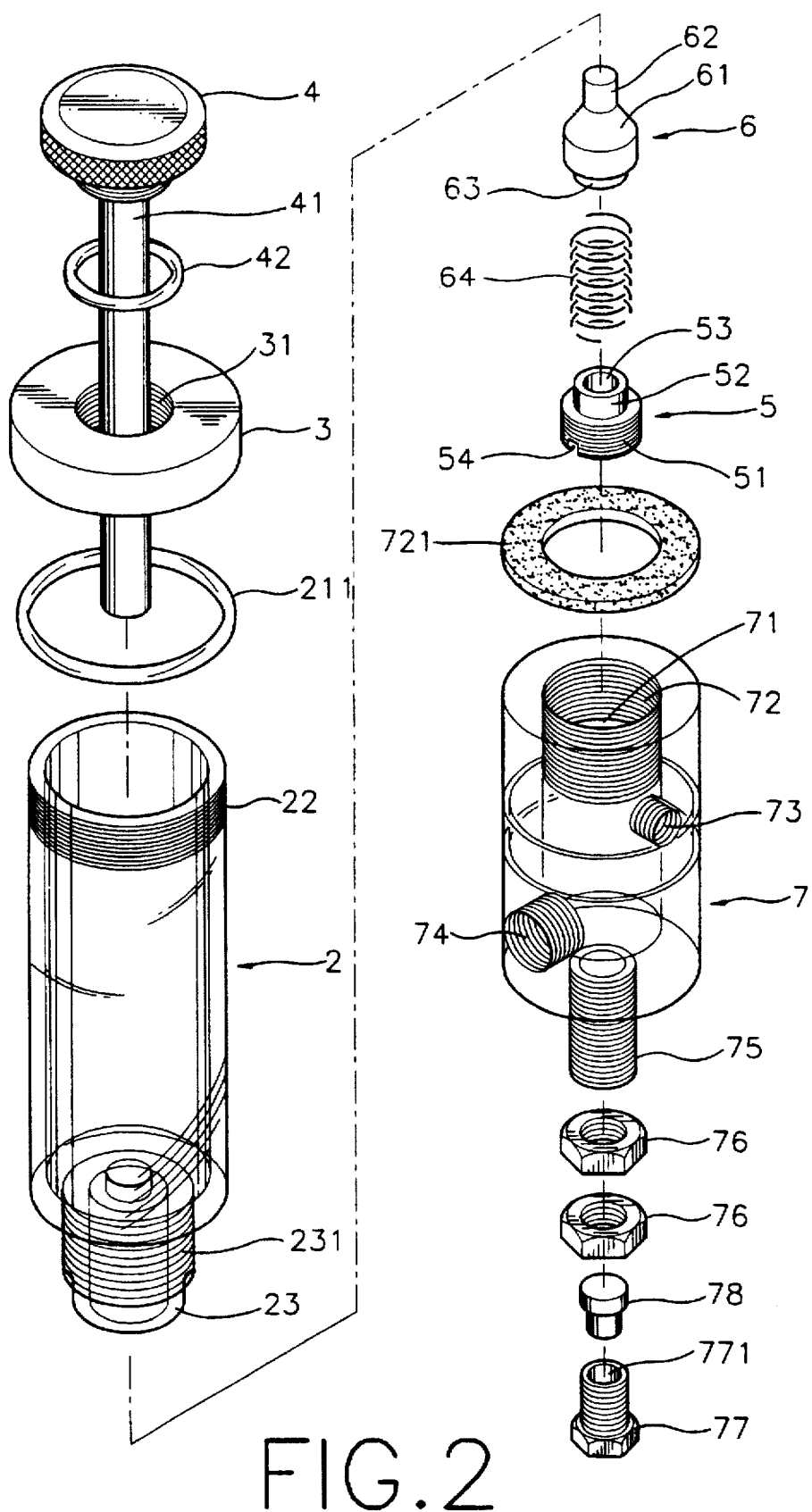
FIG. 2 shows an exploded view of the preferred embodiment of the present invention.

As illustrated in all drawings provided herewith, an automatic oil replenishing device 1 of the preferred embodiment of the present invention is intended for use in replenishing a machine with a constant quantity of the lubricating or hydraulic oil for preventing the breakdown or damage of the machine. The automatic device of the present invention comprises an oil container 2, a cap 4, an oil injecting seat 5, an oil blocking body 6, and a connection seat 7.

The oil container 2 is composed of a transparent cylindrical body 21 of a hollow construction. The cylindrical body 21 is used for containing the liquid oil and is provided around the brim thereof with an outer threaded portion 22 which is engaged with an inner threaded portion of an upper cover 3 in conjunction with a washer 211. The upper cover 3 is provided at the center thereof with a threaded hole 31. The cylindrical body 21 is provided at the bottom thereof with a joint 23 fastened therewith. The joint 23 is tubular in construction and is provided at the top thereof with an outer threaded portion 231. The joint 23 is further provided in the inner wall of the lower end thereof with an inner threaded portion 232. The joint 23 is still further provided in the top end thereof with a tapered port 233.

The cap 4 is provided in the underside thereof with a threaded projection, which is engaged with the threaded hole 31 of the upper cover 3 in conjunction with a washer 42. The cap 4 is further provided in the underside thereof with an urging rod 41 fastened therewith.

The oil injecting seat 5 is provided in the outer wall of the lower end thereof with an outer threaded portion 51, which is engaged with the inner threaded portion 232 of the joint 23. The oil injecting seat 5 is further provided in the upper side thereof with a cylindrical projection 52 having an axial hole 53, and in the underside thereof with a cut 54.

The oil blocking body 6 has a tapered disk body 61 which is provided in the upper side thereof with a short cylindrical protuberance 62 and in the underside thereof which a connection protuberance 63. The connection protuberance 63 is fitted into the upper end of a coil spring 64. In the meantime, the lower end of the coil spring 64 is fitted over the cylindrical projection 52 of the oil injecting seat 5. The top of the cylindrical protuberance 62 of the disk body 61 of the oil blocking body 6 is in contact with the bottom end of the urging rod 41 of the cap 4.

The connection seat 7 of a cylindrical construction is provided therein with a receiving compartment 71, which is in turn provided in the outer wall of the midsegment thereof with a ring groove 711 and in the inner wall of the top end thereof with an inner threaded portion 72. The inner threaded portion 72 of the connection seat 7 is engaged with the outer threaded portion 231 of the joint 23. The connection seat 7 is further provided in the wall of the upper segment thereof with an air hole 73 in communication with the receiving compartment 71. Located in the wall of the lower segment of the connection seat 7 is an oil outlet 74 in communication with the receiving compartment 71 and engageable with an outer tube. The connection seat 7 is still further provided on the bottom end thereof with a collection tube 75 of a predetermined length. The collection tube 75 is provided on the outer wall thereof with outer threaded portions engageable with two nuts 76 and on the inner wall thereof with inner threads 751 engageable with an oil discharging bolt 77. The oil discharging bolt 77 has a slot 771 in which a magnet 78 is disposed for attracting the oil residue.

Figure 4:
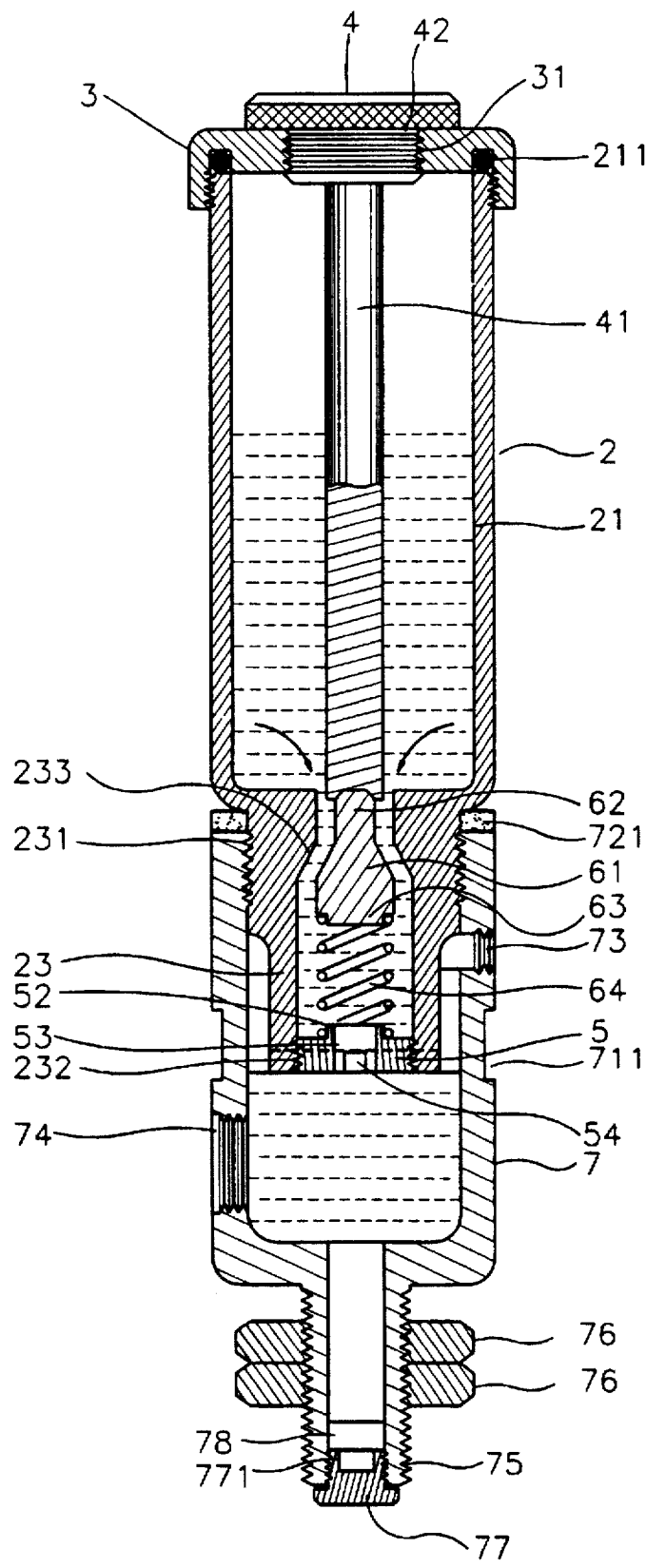
FIG. 4 is a sectional schematic view illustrating the state in which the oil replenishing of the device of the present invention is terminated.

In operation, the outlet 74 of the connection seat 7 is connected with the oil container of a mechanical system. Before adding the oil to the container 2 of the device 1 of the present invention, the cap 4 is turned to become loosened. As the cap 4 is being turned, the oil blocking body 6 is forced by the elastic force of the coil spring 64 to move upwards so as to cause the tapered port 233 of the joint 23 to be obstructed by the disk body 61 of the oil blocking body 6. On the other hand, as the cap 4 is tightened by engaging with the threaded hole 31 of the upper cover 3, the cylindrical protuberance 62 of the oil blocking body 6 is urged by the urging rod 41 of the cap 4, thereby resulting in the formation of a gap between the tapered port 233 of the joint 23 and the disk body 61 of the oil blocking body 6. As a result, the oil contained in the container 2 of the device 1 is allowed to flow into the connection seat 7 via the gap and the anal hole 53 of the oil injecting seat 5. The oil level is kept at the cut 54 of the oil injecting seat 5, as illustrated in FIG. 4.

Figure 3:
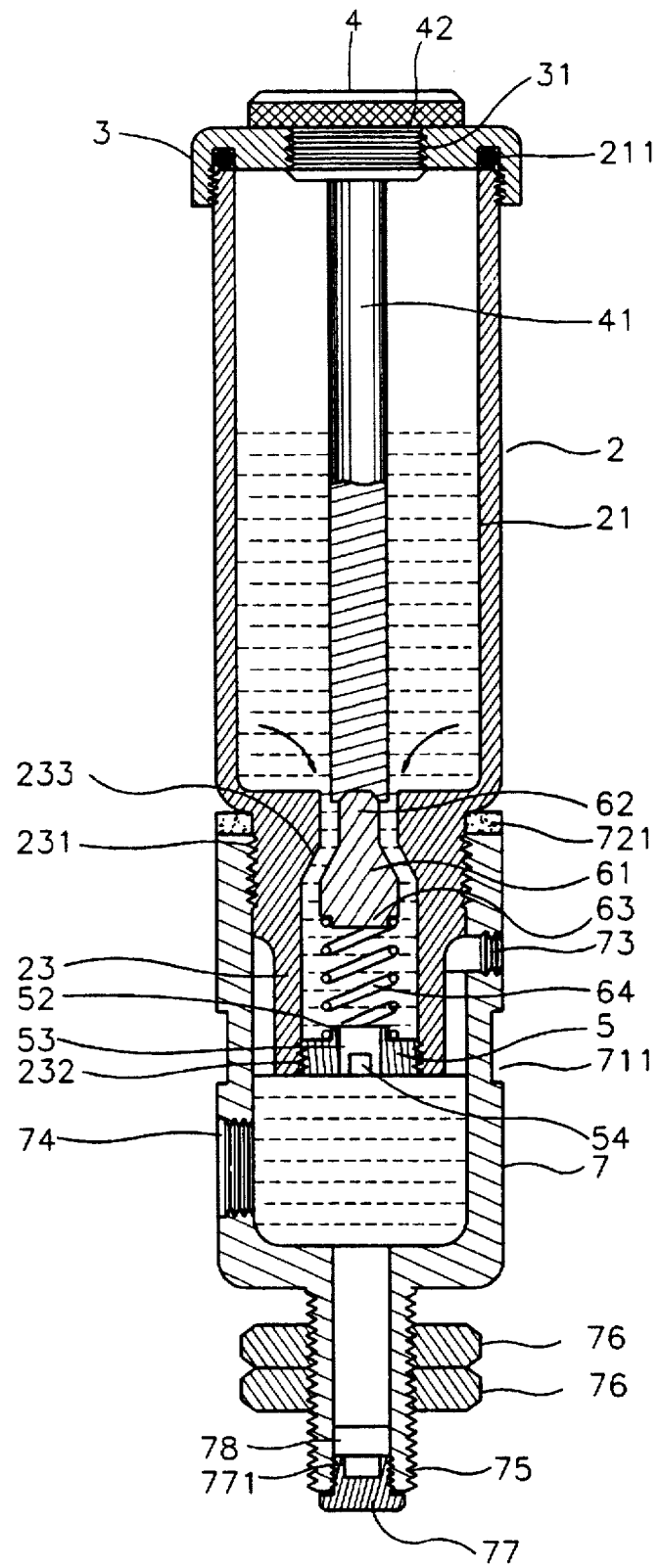
FIG. 3 is a sectional schematic view illustrating the state of the oil replenishing of the device of the present invention.

The oil level in the connection seat 7 drops along with the reduction in the oil level in the oil container of the mechanical system. As the oil level in the connection seat 7 drops to an extent that the oil level surface and the cut 54 of the oil injecting seat 5 form therebetween a gap, the atmospheric air is allowed to enter the connection seat 7 via the air hole 73 of the connection seat 7. As a result, the atmospheric air is allowed to enter the oil injecting seat 5 via the gap, as illustrated in FIG. 3. As the oil replenishing process is brought about by the device 1 of the present invention, the gap formed between the oil level surface and the cut 54 of the oil injecting seat 5 is eventually eliminated such that the atmospheric air is no longer allowed to enter the connection seat 7, and that the process of replenishing oil is brought to a halt, as illustrated in FIG. 4. In addition, the magnet 78 serves to attract the oil residue, which is removed by the discharging bolt 77.

The oil level adjustment can be attained by rotating the joint 23 to move upwards so that the joint 23 is kept apart from the connection seat 7 by a distance. The oil container 2 and the connection seat 7 are provided therebetween with a washer 79 for reinforcing the sealing effect. The upward adjustment of the oil container 2 is done in accordance with the actual oil level. Moreover, the ring groove 711 of the connection seat 7 is intended to locate the oil level standard line between the mechanical system and the device 1 of the present invention. In other words, the desired oil level of the mechanical system can be set by adjusting the height of the ring groove 711.

The device 1 of the present invention is capable of automatic detection of the state of the oil consumption, and of automatic replenishment of the oil. In addition, when the oil consumption of the cylindrical body 21 of the oil container 2 is excessive, the machine operator is alerted for a possible oil leak, so as to prevent the mechanical system in operation from being damaged.

It must be noted here that the connection seat 7 of the device 1 of he present invention is transparent so as to enable the machine operator to detect easily the presence of air bubbles or impurities in the oil.

The embodiment of the present invention described above is to be regarded in all respects as being merely illustrative and not restrictive. Accordingly, the present invention may be embodied in other specific forms without deviating from the spirit thereof The present invention is therefore to be limited only by the scopes of the following appended claims.

What is claimed is:

1. An automatic horizontal replenishing device for liquid oil, said device comprising:

a transparent oil container provided around a brim thereof with an outer threaded portion that engages an inner threaded portion of an upper cover in conjunction with a washer, said oil container further includes at a bottom thereof a joint fastened therewith, said joint includes at a top end thereof an outer threaded portion and a tapered port, said joint further includes in an inner wall of a bottom end thereof an inner threaded portion;

a cap includes on an underside thereof a threaded projection engaging a threaded hole of said upper cover in conjunction with a washer, said cap further includes in an underside thereof an urging rod fastened thereto;

an oil injecting seat includes in an outer wall of a lower end thereof an outer threaded portion engaging said inner threaded portion of said joint, said oil injecting seat further includes on an upper side thereof a cylindrical projection and in an underside thereof a cut, said cylindrical projection includes an axial hole;

an oil blocking body comprising a disk body which includes in an upper side thereof a cylindrical protuberance and in an underside thereof a connection protuberance, said oil blocking body further comprising an elastic element which has one end fitted over said connection protuberance and further has another end fitted over said cylindrical projection of said oil injecting seat, said cylindrical projection being urged by a free end of said urging rod of said cap; and a connection seat that includes in an outer wall thereof a ring groove and further provided therein with a compartment, said compartment includes in an inner wall of a top end thereof an inner threaded portion which is engaged with said outer threaded portion of said joint, said connection seat further includes in an upper segment thereof an air hole in communication with said compartment, and in a lower segment thereof an oil outlet in communication with said compartment.

2. The device as defined in claim 1, wherein:

said joint can be rotated so as to be separated from said connection seat; and wherein said oil container and said connection seat are provided therebetween with at least one washer.

* * * * *